United States Patent [19]

Horijon et al.

[11] Patent Number: 5,512,760

[45] Date of Patent: Apr. 30, 1996

[54] OPTICAL HEIGHT DETECTOR WITH COAXIAL IRRADIATION AND IMAGE AXES AND PLURAL DETECTORS SPACED ALONG THE IMAGE AXIS

[75] Inventors: Joseph L. Horijon; Christiaan H. F. Velzel; Cornelis S. Kooijman, all of Eindhoven, Netherlands

[73] Assignee: U. S. Philips Corporation, New York, N.Y.

[21] Appl. No.: 236,775

[22] Filed: Apr. 29, 1994

[30] Foreign Application Priority Data

May 6, 1993 [EP] European Pat. Off. .............. 93201304

[51] Int. Cl.⁶ .......................... G01N 21/86; G01B 11/30
[52] U.S. Cl. ................. 250/559.29; 250/559.22; 356/4.05
[58] Field of Search ...................... 250/561, 560, 250/571, 201.4, 201.8, 227.11, 227.2, 227.29, 227.31, 227.32, 559.29, 559.31, 559.38, 559.22, 559.23; 356/4, 373, 375, 376, 378, 381, 4.01, 4.05, 3.01, 3.03, 3.06, 3.07

[56] References Cited

U.S. PATENT DOCUMENTS

| | | | |
|---|---|---|---|
| 4,567,362 | 1/1986 | Kunz | 250/201.4 |
| 4,715,708 | 12/1987 | Ito | 250/201.4 |
| 4,782,239 | 11/1988 | Hirose et al. | 250/561 |
| 5,179,287 | 1/1993 | Kitajima et al. | 250/561 |

FOREIGN PATENT DOCUMENTS 0437883  7/1991  European Pat. Off. .

OTHER PUBLICATIONS

"Optical Surface Microtopography Measurement and/or Automatic Focusing" IBM Technical Disclosure Bulletin, vol. 15, No. 2, Jul. 1972, pp. 504–505.

Sensors and Actuators A, vol. A31, No. 1/3, 1992, Lausanne CH pp. 68–74 Butler et al 'novel non contact sensor for surface topography measurement using a fibre optic principle'.

Search Report.

*Primary Examiner*—Edward P. Westin
*Assistant Examiner*—John R. Lee
*Attorney, Agent, or Firm*—Michael J. Balconi-Lamica

[57] ABSTRACT

The height of a surface (25) along an axis (4) is determined by measuring the axial position of an irradiated spot (31) formed on the surface at the intersection of the surface and the axis. Radiation reflected by the surface and collected by a lens (8) forms an image spot (32) on the axis (4). The position of the image spot is determined by measuring the intensity of the radiation at at least three positions along the axis by means of a detection unit (35). The output signals (44, 44') of the detection unit are processed in an electronic means (43) for determining the position of the highest radiation intensity and for supplying a signal (43') whose magnitude represents the axial position of the image spot (32), hence, of the irradiated spot (31).

16 Claims, 4 Drawing Sheets

OPTICAL HEIGHT DETECTOR WITH COAXIAL IRRADIATION AND IMAGE AXES AND PLURAL DETECTORS SPACED ALONG THE IMAGE AXIS

BACKGROUND OF THE INVENTION

The invention relates to a device for optically measuring the height of a surface of an object, which device comprises a radiation source for generating an irradiating beam which is directed along a predetermined beam axis and forms an irradiated spot on the surface, and an imaging system for converging radiation from the irradiated spot to a radiation beam forming an image spot on the beam axis in the image space of the image system.

Such a device is used, for example, to check whether a surface has the desired profile or whether a flat plate is actually flat and does not have any grooves or projections. The device may also be used to check whether holes and elevations are provided at the correct positions on a substrate plate and may further be used, for example, for inspecting electronic circuits comprising electrically insulating plates provided with conducting metal strips and electronic components. Another use of the device is focus-point detection.

A device as described in the opening paragraph is known, inter alia, from the article "Optical Surface Microtopography Measurement and/or Automatic Focusing" published in IBM Technical Disclosure Bulletin, Vol. 15, No. 2, July 1972, pages 504–505. In this device a laser beam is focused by a lens system to form an irradiated spot on the surface of an object. Part of the radiation reflected by the surface is captured by the lens system and subsequently reflected out of the laser beam by a beam splitter. A further beam splitter forms two sub-beams from the reflected radiation beam. Each sub-beam comes to a focus, forming an image of the irradiated spot. The radiation in each sub-beam is measured by a detector with a pin hole aperture on the axis of the sub-beam and in front of the radiation-sensitive surface of the detector. In one sub-beam the pin hole is placed in the sub-beam before the image formed by the sub-beam, in the other sub-beam the pin hole is placed in the sub-beam behind the image formed by the other sub-beam. The output signals of the two detectors are fed to a differential amplifier. When the output signal of the differential amplifier is zero, both detectors receive an equal amount of radiation. Consequently, the two images must be equidistant to the respective pin holes. In other words, the focus or position of highest intensity of the image spot is midway between the two pin holes. A change in the height of the surface, causing a change in the position of the irradiated spot, leads to a change in the position of the image spots. The pin hole closest to the displaced corresponding image spot will capture more radiation than the pin hole further away from its image spot, which results in different output signals of the two detectors and in an output signal of the differential amplifier unequal to zero. The output signal of the differential amplifier is thus a measure of the height of the surface.

The range over which the known device can measure the height is determined by the axial distance between the two pin holes. A large distance between the two detectors yields a large height range, a small distance yields a small range. The resolution of the height measurement is inversely proportional to the height range. This means that a device with a small height range can measure the height with a relatively high resolution, whereas a device with a large height range can measure the height with a low resolution. A drawback of the known device is that it cannot measure heights over a large range with a high resolution.

SUMMARY OF THE INVENTION

It is an object of the invention to provide a device for optically measuring the height of a surface over a relatively large height range with a relatively high resolution.

According to the invention, this object is achieved by a device as described in the opening paragraph characterized by a detection unit arranged in the image space for receiving radiation from the radiation beam at at least three different positions along the beam axis and for converting said radiation into electric signals and by electronic means for determining, from said signals, that position of the at least three positions which receives the maximum amount of radiation, said position being related to the height of the surface at the location of the irradiated spot.

The height range is now determined by the axial distance between the outermost positions for receiving radiation, whereas the resolution is determined by the number of positions in the detection unit. Thus the height range and resolution can be determined independently. A device which must be able to measure height over a large range with a high resolution can be equipped with a detection unit with a large number of positions and a large axial distance between the outermost positions. The position of maximum intensity, which is the position of the image spot, is determined by the electronic means from the output signals of the detection unit. This position is related to the position of the irradiated spot, i.e. the height of the surface through the magnification of the imaging system. The imaging system may comprise one or more lenses and/or curved mirrors.

The subassembly of detection unit and associated electronic means of the device according to the invention has two preferred embodiments. In the first embodiment the detection unit comprises at least three discrete detectors, each having an output for supplying an electric signal whose magnitude is related to the amount of radiation of the radiation beam captured by said detector, said electronic means being an electronic circuit having inputs connected to the detector outputs for determining the detector capturing the largest amount of radiation, the position of said detector being related to the position of maximum intensity of the image spot along the beam axis. The resolution of the height measurement can be further improved if the electronic means do not only determine the detector receiving the largest amount of radiation, but also interpolate between the detectors, thereby determining the position of maximum intensity with a resolution equal to a fraction of the distance between neighbouring detectors. Use of a detector array, in which the discrete detectors are integrated in one component, has the advantage that the mutual positions of the detectors are accurately known, which leads to a precise conversion from the actual detector capturing the largest amount of radiation to the corresponding position along the beam axis.

In the second preferred embodiment of the subassembly the detection unit is constituted by a linear position-sensitive detector with its radiation-sensitive surface being parallel to the beam axis and having at least one pair of outputs arranged at opposite sides of the radiation-sensitive surface, said electronic means comprising a dividing circuit, inputs of which are connected to said outputs, for supplying a signal whose magnitude is a measure of the position of maximum intensity of the image spot. The position-sensitive detector may be regarded as an infinite number of juxtaposed detectors, allowing a measurement of the position of the image spot with a very high resolution and at a high speed. The two embodiments of the subassembly can be used advantageously in each embodiment of the device according to the invention, as described in the claims.

It is to be noted that a device for optically measuring the height of a surface, comprising a position-sensitive detector is known from European Patent Application EP-A 0 437 883. This position-sensitive detector is used to measure the height according to the triangulation method. Hence, it does not have its radiation-sensitive surface parallel to the beam axis. The triangulation method requires an angle between the direction of observation and the direction of irradiation. The resulting shadows cast by steep slopes of the surface, for instance by electronic components mounted on a plate, cause measurement problems. Such problems do not occur when the irradiation and observation of the surface are made along the same axis.

If a series of detectors is placed along the beam axis with their radiation-sensitive surfaces perpendicular to the axis, the anterior detectors will intercept part of the radiation, destined for the posterior detectors. However, if a series of detectors is placed along the beam axis with their radiation-sensitive surfaces parallel to the axis, the problem of intercepting radiation is reduced, but the efficiency of the detection might also be reduced by the large angle of incidence of the radiation on the radiation-sensitive surface, causing a smaller fraction of the radiation to be refracted into the detector. According to the invention the interception is reduced and a high capture efficiency is obtained in that radiation from the beam axis is guided to a location away from the beam axis, with more freedom of arranging the detection unit. The radiation must be guided in such a way that an image of the beam axis is formed on the detection unit. The embodiments with such guiding can be divided in two classes.

An embodiment of the device of the first class has a series of reflectors positioned along the beam axis for reflecting radiation from the radiation beam towards the detection unit. The reflectors can be made smaller than discrete detectors, thereby reducing the interception of radiation around the beam axis. Moreover, a suitable choice of the transmission coefficient of the reflector and the medium around the reflector provides the possibility of realizing a uniform attenuation over the cross-section of the radiation beam, thus improving the response of the posterior detectors.

A special embodiment of a device of the first class has a number of transparent plates corresponding to the number of reflectors, each plate being arranged in the radiation beam and comprising a reflector in the form of a part of a surface of said plate, the reflected radiation from this part being transmitted via internal reflections at the plate surfaces towards an exit face of the plate facing the detection unit. Each plate has the function of both reflector and light guide. The direction of the diffracted beam is dictated by the law of reflection and the law of diffraction, giving more freedom for the orientation of the plates. The reflector preferably comprises a grating. The major part of the radiation reflected by the grating will be diffracted towards the detection unit if the grating is provided with a suitable blazing.

A device of the second class comprises a series of optical fibres, each having an entrance face located on the beam axis and an exit face facing the detection unit. The small size of the fibres gives a correspondingly small interception of radiation. By offering the fibres in such a way that the direction of the axis of each fibre is substantially equal to the average direction of the rays in the radiation beam incident on the entrance face of the fibre, the radiation will enter the fibres substantially along the axes of the fibres and preferably within the numerical aperture of the fibres, thus minimizing the reflection losses on the entrance faces. The fibres preferably constitute a fibre plate, thereby providing a component which can be easily aligned and combines a good mutual alignment of the fibres with a high packing density.

A preferred embodiment of the device of the second class comprises a transparent body having an entrance surface and an exit surface being located in the optical path of the radiation beam, said exit surface containing the beam axis, said radiation beam entering the body through the entrance surface, the entrance face of the fibres being optically connected to the exit surface, and the refractive index of the body being substantially equal to the refractive index of the core of the fibres. Since part of the space where the image spot is formed is filled with a material having the same refractive index as the cores of the fibres, most of the radiation in the radiation beam will be coupled into the fibres and is not lost by reflection on the entrance faces of the fibres.

Preferably, the curvature of the entrance surface of the body is substantially equal to the curvature of the wavefront of the radiation beam at the entrance surface. The curvature of the wavefront is preferably the average taken over all possible curvatures of the wavefront that can occur over the measurement range. This shape of the entrance surface has the advantage that the wavefront is not distorted on entering the body, which would cause an aberrated image spot, leading to inaccurate height measurements.

In the devices of the second class all radiation in that part of the radiation beam which is on the fibre-side of the plane formed by the entrance surfaces of the fibres is intercepted by the cladding of the fibres. This radiation may still be used if the otherwise intercepted part of the radiation is reflected away from the fibres by a mirror, thereby forming a mirror image of the beam axis. A further detection unit may be arranged along the mirror image of the beam axis to supplement the measurement of the first detection unit.

The resolution of the height measurement, which is attainable with a series of discrete detectors or a series of reflectors or fibres, is limited by the axial distance between these elements. To overcome this limitation, a special embodiment of the device is provided with a hologram for dividing the radiation beam into a series of subbeams, each having a sub-axis and each forming a sub-image spot, where the sub-image spots are displaced relative to one another in directions perpendicular and parallel to the beam axis and in which at least one detector is located on each sub-axis. A higher resolution using the same elements can be obtained when the radiation beam is divided into sub-beams. In order to increase the measuring range, each detector may be replaced by a detection unit. The detection units occupy the same axial positions along the sub-beams, but the sub-image spots have different axial positions, such that they evenly divide the axial distance between the elements. The outputs of the detection units may be combined to give a measure or the height of the object with a higher resolution than is attainable with a single detection unit.

Another embodiment of the device overcoming said limitation is provided with a hologram for forming a series or subbeams from the radiation beam, each sub-beam having a sub-axis and each forming a sub-image spot, where the sub-image spots are displaced relative to another in a direction perpendicular to the beam axis, and at least one detector is located on each sub-axis, the detectors occupying different positions in a direction parallel to the beam axis. The sub-image spots have the same axial position, whereas the detection units along each sub-axis have different axial positions.

The device provided with a hologram preferably has a lens arranged in the path of the subbeams between the hologram and the detectors, such that the hologram is in a focal plane of the lens. The sub-axes are then parallel, which facilitates the alignment of the detection units along the sub-axes.

These and other aspects of the invention will be apparent from and elucidated with reference to the embodiments described hereinafter.

DETAILED DESCRIPTION OF THE PREFERRED EMBODIMENT

Figure 1:
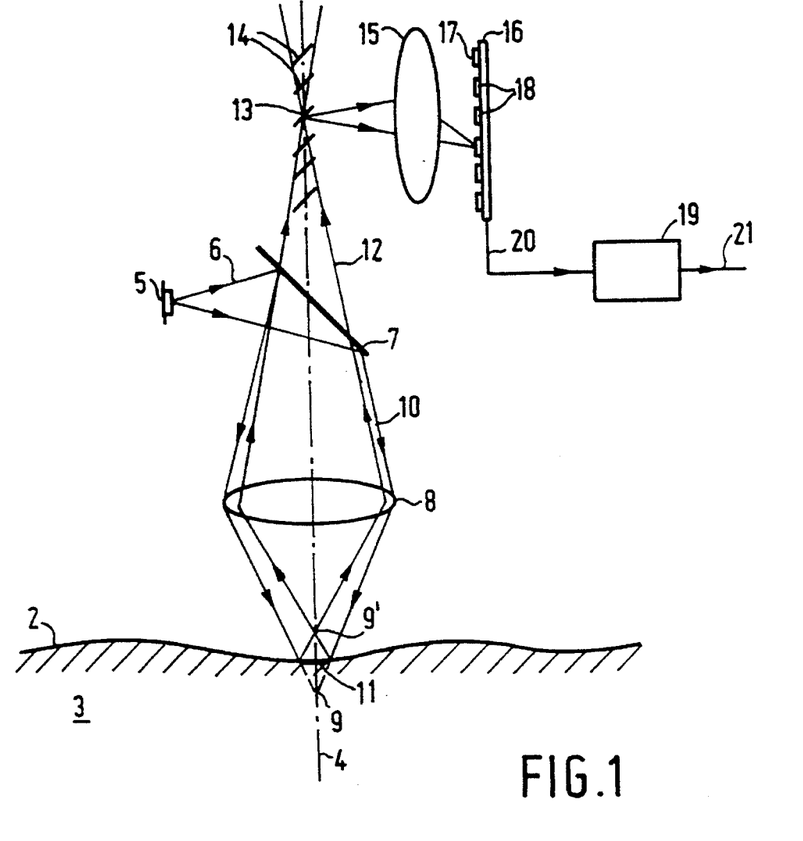
FIG. 1 shows a height-measuring device with a series of reflectors on the beam axis and a focused irradiating beam.

FIG. 1 shows a device 1 according to the invention for optically measuring the height of a surface 2 of an object 3 along an axis 4. The device comprises a radiation source, for example a laser diode 5 emitting a divergent irradiating beam 6. A beam splitter, for example a semitransparent mirror 7 reflects the irradiating beam towards an imaging system 8, which converges the radiation towards a point 9 on the axis 4. The imaging system is depicted as a single lens 8, but it may alternatively be a multi-lens system or a reflection system with one or more mirrors. The beam axis of the irradiating beam 10 incident on the imaging system coincides with the axis 4. Preferably, the optical axis of the imaging system also coincides with the axis 4, as shown in FIG. 1, in order to reduce the aberrations of the imaging system. The described irradiating system with elements 5, 7, 8 is eminently suitable for measuring the height of reasonably flat, specularly reflecting surfaces. The irradiating beam forms an irradiated spot 11 on the surface 2 which specularly reflects the radiation to a converging point 9' which is the mirror image of point 9 with respect to the surface 2. If the surface is reasonably flat, the converging point will lie substantially on the axis 4. The lens forms a converging radiation beam 12 which focuses to an image spot 13 in the image space of the lens. The image spot 13 lies approximately on the axis 4.

If the object 3 is moved with respect to the device 1, the height of the irradiated spot 11 along the axis 4 will change, resulting in a change in the position of the converging point 9' and, consequently, in a change in the position of the image spot 13 along the axis 4. The position of the surface at the intersection of the axis determines the position of the converging point 9' by virtue of the law of reflection, whereas the position of the converging point 9' determines the position of the image spot 13 by virtue of the magnification of the lens 8. Hence, the position of the surface 2 can be determined from the position of the image spot 13.

Figure 2:
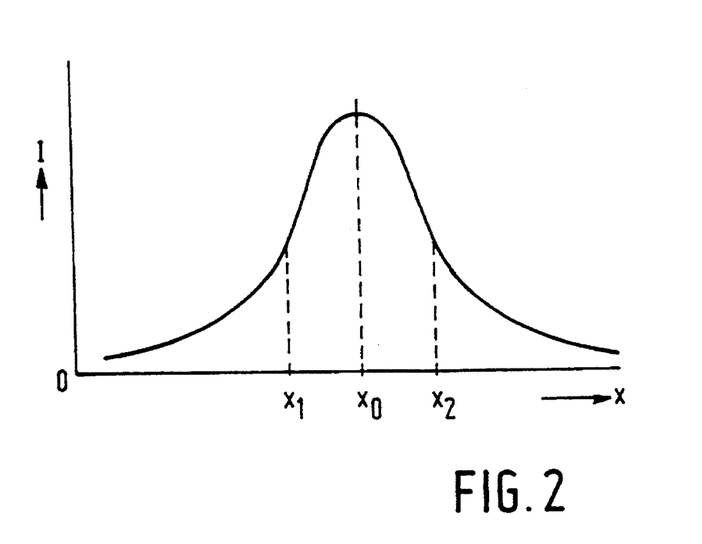
FIG. 2 shows the intensity distribution of radiation along the beam axis around the image spot.

The position of the image spot can be derived from a measurement of the intensity of the radiation along the axis 4. FIG. 2 shows an intensity distribution along the axis 4 around the position of the image spot 13. The point $x_0$ with the highest intensity is defined as the position of the image spot. For an accurate measurement of point $x_0$ it is necessary to have a reasonable number of positions along the axis where the intensity of the radiation is measured. It has turned out that the radiation must be measured at at least three positions within the FWHM of the intensity distribution. The FWHM is the full-width-half-maximum of the distribution, which is the distance between the points $x_1$ and $x_2$ in FIG. 2 where the intensity has dropped to half the value at point $x_0$. In general, the FWHM is approximately 3.5 focal depths of the imaging system 8, as measured in the image space. The focal depth is equal to $\lambda/NA^2$, with $\lambda$ being the wavelength of the radiation and NA being the numerical aperture in the image space. Consequently, for an accurate measurement of the position of the image spot, the space between measurement positions should be less than one focal depth.

In order to measure the position of the image spot 13, a series of small reflectors 14 is arranged on the axis 4, six of which are shown in FIG. 1. The positions of the reflectors along the axis 4 correspond to measurement positions x along the horizontal axis in FIG. 2. Each reflector reflects at least part of the radiation incident on it towards a lens 15 which forms an image of the reflectors on a detection unit 16. In fact, the lens 15 images the axis 4 on the detection unit, giving a one-to-one relation between the positions along the axis and the positions along the radiation-sensitive surface 17 of the detection unit. For the sake of clarity, the Figure shows only the beam reflected from one of the reflectors 14.

The detection unit 16 shown in FIG. 1 comprises a series of discrete detectors 18, each of which corresponds to one of the reflectors 14 by virtue of the imaging properties of lens 15. It is also possible to have a number of detectors which is larger or smaller than the number of reflectors, the resolution of the position measurement being determined by the smallest of the two numbers. The discrete detectors can be integrated in a detector array which has a very close packing of detectors, and yields a high resolution. The output signals 20 of the detectors are transmitted to an electronic circuit 19 which processes the output signals to an electric height signal 21, the magnitude of which is related to the axial position of the image spot. The output signals 20 can be transferred in parallel along a number of connections which is equal to the number of detectors, or in series, i.e. time-sequentially, along a single connection. The choice depends on the type of detection unit and the desired measurement speed.

The electronic circuit 19 comprise at least one comparator for determining the detector which gives the largest signal.

That detector thus captures the largest amount of radiation and therefore has a position close to the position of the image spot. If a resolution higher than the spacing of the detectors 18 is desired, the electronic means must have an interpolator, yielding a resolution which is equal to a fraction of the spacing of the detectors. Such an interpolator can determine the position of maximum intensity by comparing the differences between the signal values of neighbouring detectors or by fitting a curve through the signal values of all detectors and determining the position of maximum intensity from the curve. In general, the higher resolution requires an additional effort in calculations, thereby slowing down the measurement speed of the device.

Figure 3:
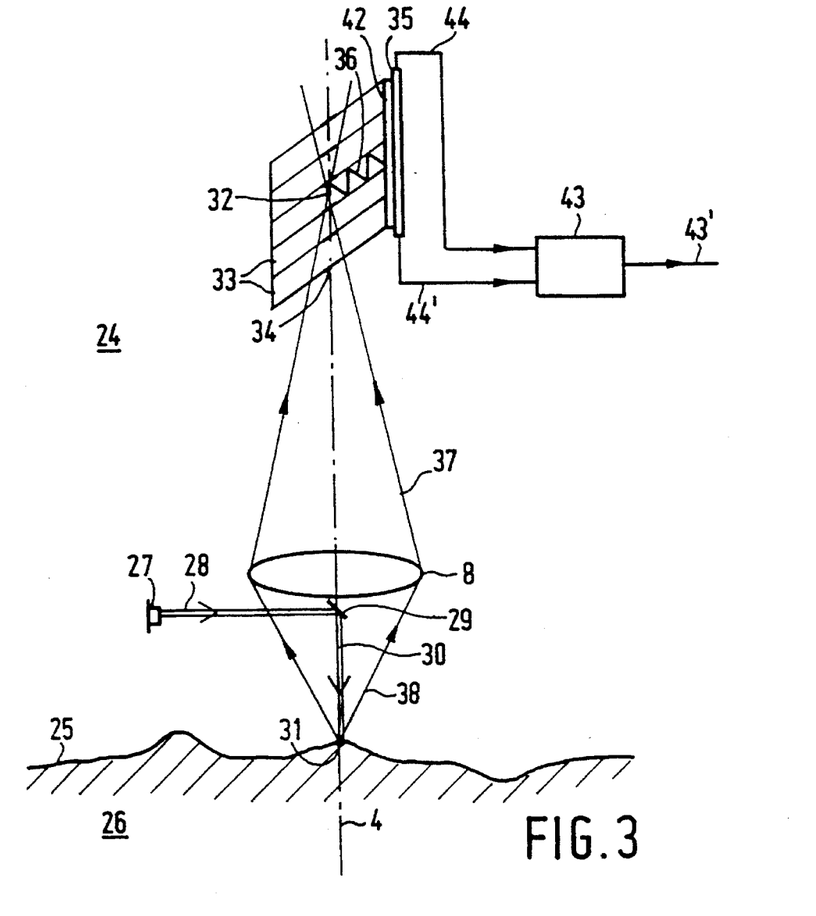
FIG. 3 shows a height-measuring device with a series of transparent plates of the beam axis on a parallel irradiating beam.

FIG. 3 shows another embodiment 24 of the device for measuring the height of a surface 25 of an object 26. The device comprises a radiation source 27 emitting a parallel irradiating beam 28 which, after reflection on a small mirror 29, forms an irradiating beam 30 incident on the surface 25 along the axis 4. The irradiating system with elements 27 and 29 is eminently suitable for measuring the height of diffusely reflecting surfaces. The irradiating beam 30 illuminates a small irradiated spot 31 on the surface 25. The mirror 29 may also be placed on the other side of the lens 8. The irradiating beam 30 will then be converged by the lens 8, thereby reducing the size of the irradiated spot 31, increasing the lateral resolution of the device. The lens 8 captures a cone 38 of radiation diffusely reflected from the irradiated spot and forms an image spot 32 of the irradiated spot 31 on the axis 4. A change in the height of the surface at the location or the irradiated spot 31 will cause a change in the position of the irradiated spot along the axis 4, which in turn will cause a change in the position of the image spot 32. The relation between the positions of the irradiated spot and the image spot is fixed by the magnification of the lens 8. It will be evident that the irradiating systems comprising the elements 5, 7, 8 as shown in FIG. 1 and 27, 29 as shown in FIG. 3 are interchangeable.

In order to measure the position of the image spot 32, a series of stacked transparent plane parallel plates 33 is arranged along the axis 4. A part of a surface of each plate intersecting the axis 4 forms a reflector 34 which reflects at least part of the radiation incident on it towards a detection unit 35 mounted on the end faces of the plates 33. The reflected radiation is transmitted via internal reflections at the plate surfaces, which is schematically indicated for one plate by means of the zigzag line 36.

Figure 4A:
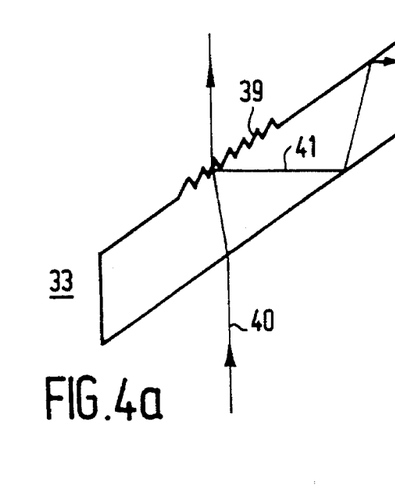
FIG. 4a shows a plane parallel plate with a grating as a reflector.

The two surfaces of each plate 33 are anti-reflex coated, except for the small part of one of the surfaces, which part acts as reflector 34. The transition of the transparent medium of the plate, for example glass, to air causes a reflection of about 4%. To obtain the glass-to-air transition, the plates 33 are spaced apart axially a small distance (not shown in FIG. 3). If the anti-reflex coating around the reflector 34 absorbs 4% of the radiation, the plates will attenuate the radiation beam 37 in the image space of lens 8 evenly over the cross-section of the beam. In this way the quality of the image spot 32, i.e. the sharpness of the intensity distribution along the axis 4, is not affected by the plates 33 in between the lens 8 and the image spot. The transmission of the radiation inside each plate 33 to the detection unit can be improved by providing the reflector 34 with a blazed grating 39, as is shown in FIG. 4a. The grating transmits a large fraction of the incident radiation and reflects a small fraction preferentially in one diffraction order, as is indicated by the ray 41. The angle between the diffracted ray 41 and the incident ray 40 can be made much larger than with a mere plane reflecting surface, because of the angle-increasing effect of the diffraction. When the angle is reasonably large, the beam reflected from the grating will be totally internally reflected by the surfaces of the plate, which reduces the transmission losses.

The device shown in FIG. 3 may be provided with the detection unit 16 comprising discrete detectors and the associated electronic means 19 as shown in FIG. 1. It is alternatively possible to use a detection unit with a linear position-sensitive detector 35. Such a detector has an elongated radiation-sensitive surface 42, with an output for electric signals 44 and 44' on each end of the surface. The closer the position of incidence of the radiation on the surface is to one of the outputs, the stronger the electric signal in that output. Hence, the ratio of one of the output signals of the position-sensitive detector and the sum of the output signals is a measure of the position of the mean value of the radiation distribution on the radiation-sensitive surface with respect to that output. An electronic means 43 comprising a dividing circuit is connected to the outputs 44 and 44' of the detection unit 35. An output signal 43' of the dividing circuit provides a signal whose magnitude is a measure of the mean position of the radiation distribution. The mean position can be directly equated with the position of maximum intensity. If a higher accuracy is desired, the disparity between the mean position and the position of maximum intensity of the radiation must be removed by correcting the output of the dividing circuit for the shape of the intensity distribution. A correction should also be made for the attenuation of the radiation beam caused by the 96% transmission of each of the plates 33. The position of maximum intensity, i.e. the position of the image spot 32, can be related to the height of the surface 25 at the location of the irradiated spot 31 in the same way as for the device shown in FIG. 1.

Figure 4B:
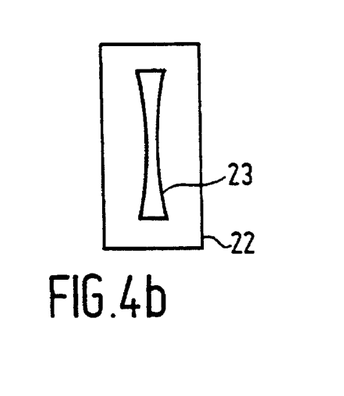
FIG. 4b shows a contrast-improving mask.

The measurement of the position of maximum intensity will be adversely affected by straylight incident on the detector. The straylight may originate from inside or outside the device. A source of straylight outside the device can be a location on the surface 25 outside the irradiated spot 31 which reflects radiation towards the lens 8. The radiation from such a location will form an image spot away from the axis 4 and, hence, give rise to a smeared-out spot on the detector. The influence of the straylight can be reduced by placing a mask 22 on the detector, which mask only transmits radiation in an elongated slit 23, as shown in FIG. 4b. The long axis of the slit coincides with the image of the optical axis on the detector. The slit may have a varying width adapted to the size of the image spot in case the irradiating beam 30 is a converging beam with a beam-waist. The mask may equally be used for both types of detection unit.

Figure 5A:
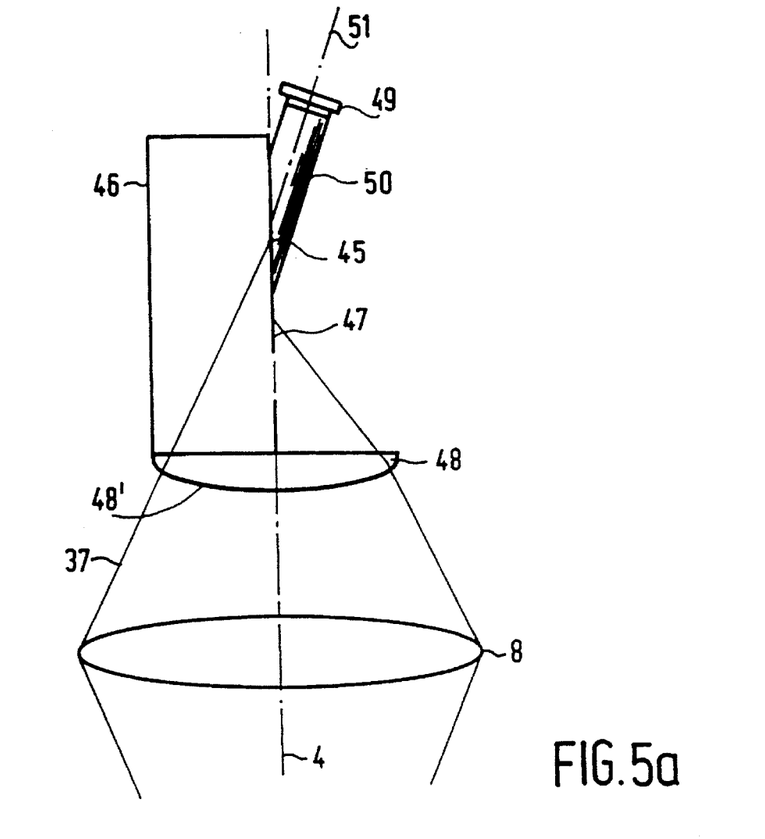
FIG. 5a shows part of a height-measuring device with a fibre plate.

FIG. 5a shows part of a height-measuring device according to the second class of embodiments, in which the radiation is guided from the beam axis to the detection unit by means of optical fibres. The irradiating system of the device may be equal to the irradiating system of the device shown in FIG. 1 or 2 with elements 5, 7, 8 and 27, 29, respectively. The radiation which is reflected by the surface being tested and is collected by lens 8 is concentrated in a converging radiation beam 37 in the image space of the lens, forming an image spot 45 on the axis 4. The image space accommodates a transparent body 46 with the axis 4 lying on a flat exit surface 47 of the body. The entrance surface 48' through which the radiation beam 37 enters the body has a curvature which is equal to the curvature of the wavefront of the radiation beam at the entrance surface, thereby avoiding the introduction of aberration into the beam by the surface.

The entrance surface 48' may be formed by a plano-convex lens 48 forming part of the body 46.

Figure 5B:
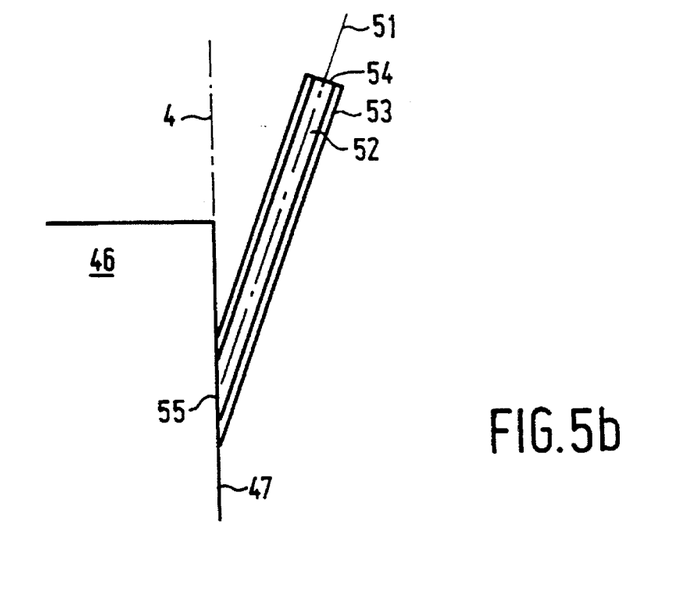
FIG. 5b shows an enlarged view of one fibre in the fibre plate.

Part of the axis 4 is imaged onto a detection unit 49 by a fibre plate 50, an oblique side of which is optically connected to the exit surface 47 and an opposite side faces the detection unit. The fibres in the fibre plate run parallel to an axis 51 with such an orientation that the capture of radiation by the fibres is optimized. FIG. 5b shows a single fibre of the fibre plate, which fibre has a core 52 and a cladding layer 53. The exit face 54 of the fibre faces the detection unit, whereas the oblique entrance face 55 of the fibre is optically connected to the exit surface 47 of the transparent body 46. The image spot on the exit surface 47 is formed by radiation only from the left-hand part of the beam 37, because the radiation from the right-hand part of the beam 37 is intercepted by the fibre plate 50. The former radiation will be efficiently coupled into the fibres if the axis 51 of the fibres is substantially equal to the average direction of the rays in the radiation beam incident on the entrance faces of the fibres. Most of the radiation will then fall within the numerical aperture of the fibres, and will be transmitted by the fibres to the detection unit. The refractive index of the body 46 is preferably equal to that of the cores 52 of the fibres to avoid reflection losses at the interface of the body and the fibres. The detection unit 49 and the associated electronic means may be the same as those of the devices shown in FIGS. 1 and 3, with elements 16, 19 and 35, 43 respectively. The resolution of the height measurement of the device shown in FIG. 5a is determined by the diameter of the fibres and the resolution of the detection unit. To reduce the effects of straylight, the mask 22 as shown in FIG. 4b can be placed between the body 46 and the fibre plate 50 or between the fibre plate 50 and the detection unit 49.

Figure 6:
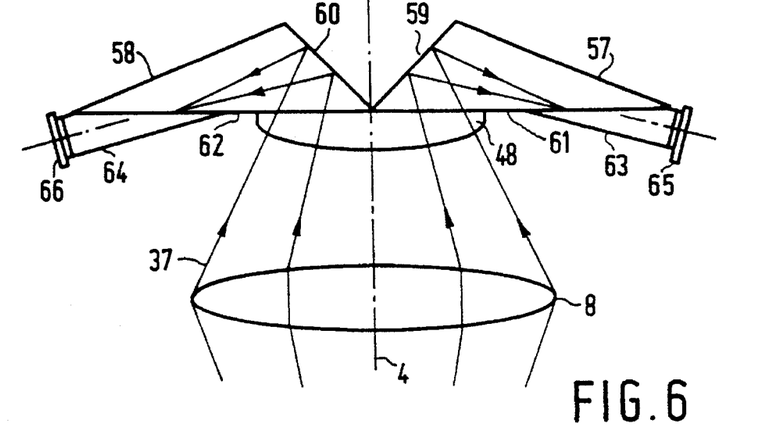
FIG. 6 shows part of a height-measuring device with two fibre plates.

FIG. 6 shows part of an embodiment of the second class in which all parts of the radiation beam 37 transmitted by the lens 8 are used for the height measurement. For that purpose the transparent body comprises a plano-convex lens 48 and two further bodies 57 and 58, each optically connected to the lens 48 and each provided with a reflector 59, 60 forming an image of the axis 4 on the exit surface 61, 62 of each body. Each exit surface 61, 62 is provided with a fibre plate 63, 64 and a detection unit 65, 66 connected thereto. One side of each body 57, 58 is provided with an absorber 67, 68 respectively, for absorbing radiation in the body which could otherwise give rise to ghost images, affecting the quality of the height measurement. In this way half of the radiation in the radiation beam 37 is used for generating signals in the detection unit 65 and the other half of the radiation is used for generating signals in the detection unit 66. The signals of both detection units can be processed as described hereinbefore. By using the signals of both detection units the signal to noise ration of the height measurement signal is increased.

The measurement accuracy of the device shown in FIG. 6 can be further improved by adding more transparent bodies and accompanying fibre plates. For example, two bodies and plates can be placed in a plane through axis 4 and perpendicular to the plane of the drawing. The radiation leaving lens 48 will then be quartered, each quarter part entering the appropriate transparent body.

Figure 7:
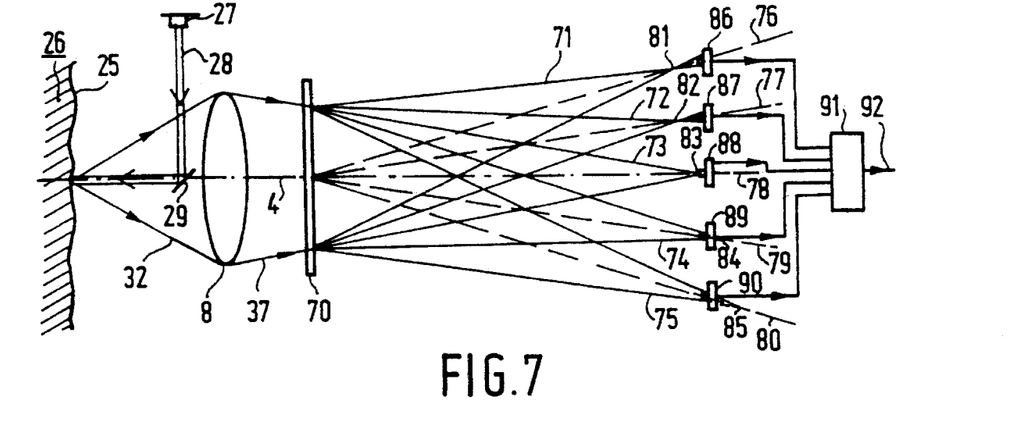
FIG. 7 shows a height-measuring device with a hologram.

FIG. 7 shows a device according to the invention, the resolution of which is not limited by the minimum axial distance between the discrete detectors, reflectors or fibres. The device irradiates the surface 25 and collects the reflected radiation in the same way as the device shown in FIG. 3. A hologram 70 is arranged in the radiation beam 37, dividing the radiation beam into a series of sub-beams 71–75 each having a sub-axis 76–80 and each forming a sub-image spot 81–85. The sub-image spots are displaced relative to one another in directions perpendicular and parallel to the axis 4. A number of discrete detectors 86–90 is arranged on the sub-axes, each detector having the same position in the direction of the axis 4. The series of sub-axes, each with a sub-image spot and a detector, can be regarded as one beam axis with one image spot and a series of closely spaced detectors. The resolution of the device is determined in part by the axial distances between the sub-image spots. The smaller the distances between the sub-image spots, the larger the resolution. The distances are fixed by the design characteristics of the hologram and can be set at any value appropriate for the desired resolution. The size of the detectors does not limit the resolution of the device shown in FIG. 7. A detector may be constituted by the combination of a radiation detector and a pin-hole aperture in front of it, or by a detector having a very small radiation-sensitive surface. Therefore, the detector gives a maximum output signal when a sub-beam is in focus on the pin-hole aperture or on the small sensitive surface. In the situation shown in FIG. 7, the detector 88, on which sub-beam 73 is focused, will give a maximum output signal. The other detectors 86, 87, 89, 90 will give a smaller output signal. The output signals of the detectors are transmitted to an electronic means 91 which determine, from said signals, the detector capturing the largest amount of radiation. The determination may proceed in the same way as in the electronic circuit 19 of FIG. 1. If the height of the irradiated spot 31 changes, the axial positions of all sub-image spots will change, thereby changing the actual detector receiving the largest amount of radiation. The value of the output signal 92 of the electronic means 91 indicating the detector receiving the maximum amount of radiation is thus a measure of the height of surface 25.

The detectors 86–90 in FIG. 7 can be combined to a detector array or to a position-sensitive detector with the same length as the row of detectors 86–90. The pin-hole apertures in front of the detectors 86–90 can then be replaced by a narrow slit with the same length as the row of detectors. The two output signals of the position-sensitive detector can be processed with an electronic means 43 as shown in FIG. 3.

It is also possible to increase the number of detectors on each sub-axis, by making several rows of detectors such as the row of detectors 86–90, each row with a different axial position.

Figure 8:
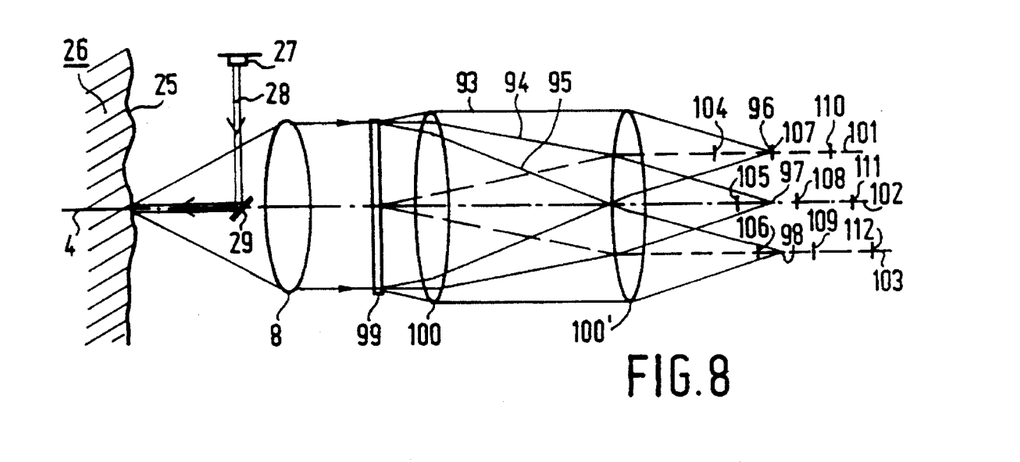
FIG. 8 shows a height-measuring device with a hologram and a field lens.

FIG. 8 shows another embodiment of the height-measuring device with a hologram. For the sake of clarity, only three sub-beams 93, 94, 95 of the hologram 99 are shown in the Figure. The sub-beams are converged to sub-image spots 96, 97, 98 by a lens 100. An additional lens 100' on the axis 4 has its focal plane at the position of the hologram 99, causing the sub-axes 101, 102, 103 of the sub-beams to be parallel on the right-hand side of the lens 100'. Hence, all detectors on the right-hand side of the lens 100' are irradiated in the same way, in contrast with the detectors in the device shown in FIG. 7, where the detectors are irradiated at different angles. The sub-image spots 96, 97, 98 have the same axial position. On each sub-axis 101, 102, 103 three detectors are arranged, numbered 104, 107, 110; 105, 108, 111; 106, 109, 112 respectively for each axis, with equal axial distances between the detectors. The axial position of the detectors 104, 105 and 106 are preferably so as to evenly divide the distance between two consecutive detectors 104 and 107 on one sub-axis. This arrangement of detectors decreases the effective axial distance between the detectors from the axial distance between the detectors 104 and 107 to the axial distance between the detectors 104 and 105. The reduction of the effective distance by a factor of three gives an increase in resolution of a factor of three. The output signals of the detectors may be processed in an electronic circuit comparable to the electronic means 91 shown in FIG. 7. The function of the lens 100 can be incorporated in lens 100', thereby reducing the number of lenses in the device by one.

The height-measuring device according to the invention may suitably include a one-dimensional or two-dimensional scanner, allowing fast height measurements over a line or plane. For a correct height measurement, the scanner must scan the radiation beams such that the beam axis 4 is displaced parallel to itself over the surface to be measured.

We claim:

1. A device for optically measuring the height of a surface of an object, which device comprises a radiation source for generating an irradiating beam which is directed along a predetermined beam axis and forms an irradiated spot on the surface, and an imaging system for converging radiation reflected from the irradiated spot to a radiation beam forming an image spot on the predetermined beam axis in the image space of the image system, characterized by a detection unit arranged in the image space for receiving radiation from the radiation beam at at least three different positions along the predetermined beam axis and for converting said radiation into electric signals and by electronic means for determining, from said signals, that position of the at least three positions which receives the maximum amount of radiation, said position being related to the height of the surface at the location of the irradiated spot.

2. A device as claimed in claim 1, wherein the detection unit comprises at least three discrete detectors, each having an output for supplying an electric signal whose magnitude is related to the amount of radiation of the radiation beam captured by said detector, said electronic means being an electronic circuit connected to the outputs for determining the detector capturing the largest amount of radiation, the position of said detector being related to the position of maximum intensity of the image spot along the beam axis.

3. A device as claimed in claim 1, wherein the detection unit is constituted by a position-sensitive detector with its radiation-sensitive surface being parallel to the beam axis and having at least one pair of outputs arranged at opposite sides of the radiation-sensitive surface, said electronic means comprising a dividing circuit, inputs of which are connected to said outputs, for supplying a signal whose magnitude is a measure of the position of maximum intensity of the image spot.

4. A device as claimed in claim 2, wherein a mask with an elongated radiation-transparent slit is arranged in the radiation path between the imaging system and the detection unit for blocking straylight.

5. A device as claimed in claim 1, having a series of reflectors positioned along the beam axis for reflecting radiation from the radiation beam towards the detection unit.

6. A device as claimed in claim 5, having a number of transparent plates corresponding to the number of reflectors, each plate being arranged in the radiation beam and comprising a reflector in the form of a part of a surface of said plate, the reflected radiation from this part being transmitted via internal reflections at the plate surfaces towards an exit face of the plate facing the detection unit.

7. A device as claimed in claim 5, wherein each reflector comprises a grating.

8. A device as claimed in claim 1, comprising a series of optical fibres, each having an entrance face located on the beam axis (4) and an exit face facing the detection unit.

9. A device as claimed in claim 8, wherein the direction of the axis of each fibre is substantially equal to the average direction of those rays in the radiation beam which are incident on the entrance face of this fibre.

10. A device as claimed in claim 8, wherein the fibres jointly constitute a fibre plate.

11. A device as claimed in claim 8, wherein a transparent body having an entrance surface and an exit surface is located in the optical path of the radiation beam, said exit surface containing the beam axis, said radiation beam entering the body through the entrance surface, the entrance face of the fibres being optically connected to the exit surface, and the refractive index of the body being substantially equal to the refractive index of the core of the fibres.

12. A device as claimed in claim 11, wherein the curvature of the entrance surface of the body is substantially equal to the curvature of the wavefront of the radiation beam at the entrance surface.

13. A device as claimed in claim 8, wherein a reflector is arranged in the image space to form a mirror image of the beam axis.

14. A device as claimed in claim 1, having a hologram arranged in the image space for dividing the radiation beam into a series of subbeams, each having a sub-axis and each forming a sub-image spot, where the sub-image spots are displaced relative to one another in directions perpendicular and parallel to the beam axis and in which at least three detectors is located on each sub-axis.

15. A device as claimed in claim 1, provided with a hologram for forming a series of subbeams from the radiation beam, each sub-beam having a sub-axis and each forming a sub-image spot, where the sub-image spots are displaced relative to one another in a direction perpendicular to the beam axis, and at least three detectors is located on each sub-axis, the detectors occupying different positions in a direction parallel to the beam axis.

16. A device as claimed in claim 14, wherein an additional lens is arranged in the path of the subbeams between the hologram and the detectors, such that the hologram is in a focal plane of the lens.

* * * * *